3,372,174
PROCESS FOR CONVERTING 17α-HYDROPEROXY-20-KETO-PREGNANES INTO THE CORRESPONDING 17-KETO-ANDROSTANES
John B. Siddall and John A. Edwards, Palo Alto, Calif., assignors to Syntex Corporation, Panama, Panama, a corporation of Panama
No Drawing. Filed June 24, 1965, Ser. No. 466,810
Claims priority, application Mexico, July 8, 1964, 77,969
11 Claims. (Cl. 260—397.3)

ABSTRACT OF THE DISCLOSURE

Process for the preparation of 17-ketoandrostanes from corresponding 17α-hydroperoxy-20-ketopregnanes by treating the latter with hydroxide or oxido of an alkaline or alkaline-earth metal or a lower alcoholate of an alkaline metal or a hydride or amide of an alkaline metal.

The present invention relates to a new method for preparing cyclopentanophenanthrene derivatives.

More particularly, the present invention relates to a new process for converting 17α-hydroperoxy-20-keto-pregnane derivatives into the corresponding 17-keto-androstane derivatives.

It is well known to those skilled in the art that sapogenin derivatives can give, by conventional degradation methods, the corresponding derivatives of the pregnane series, having present a keto group in position 20. Furthermore, Bailey et al. in J. Chem. Soc., 1578 (1962) disclosed a method for obtaining 17α-hydroperoxy-20-keto-pregnanes from the corresponding 20-keto-pregnanes. In accordance with the present invention the surprising discovery has been made that said 17α-hydroperoxy-20-keto-pregnanes may be easily converted into the corresponding 17-keto androstanes, thus completing a direct chain of degradation to the important androstane derivatives, by means of a sequence of reactions which produce high yields of the end product.

The following steroids are examples of androstane derivatives which can be prepared by the process of the present invention: Δ⁵-androsten-3β-ol-17-one, 16β-methyl-androstan-3β-ol-17-one, androstan-3β-ol-17-one, Δ⁴-androstene - 3,17 - dione, 16β-methyl-Δ⁹⁽¹¹⁾-androsten-3β-ol-17-one, and the like.

It is known to those skilled in the art that the compounds above mentioned may be converted by conventional methods into important compounds such as 17α-ethynyl-testosterone, testosterone, 2α-methyl-dihydrotestosterone and many other compounds of known therapeutic properties.

The process of the present invention may be represented by the following sequence, wherein only Ring D of the steroid nucleus is represented:

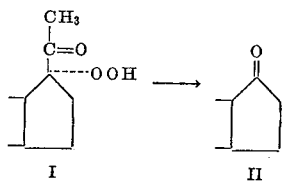

In accordance with the preceding equation, the 20-keto-17α-hydroperoxy-pregnane starting material (I) is treated with a strong base such as the hydroxide or the oxide of an alkaline or alkaline-earth metal, for example, potassium hydroxide, sodium hydroxide, calcium oxide, etc., a lower alcoholate of an alkaline metal such as sodium methylate, potassium ethylate, potassium propylate, sodium butoxide, potassium t-butoxide, etc., or similar compounds, in an organic solvent miscible with water and free from carbonyl groups, such as a lower alkanol, for example methanol, ethanol, propanol, isopropanol, butanol, t-butanol, etc., a lower hydrocarbon ether such as dioxane, tetrahydrofuran, etc., or similar solvents, or in a mixture of two or more of said solvents, or of one or more of these solvents with water, or a hydride or amide of an alkaline metal, for example sodium hydride, potassium hydride, sodamide, potassium amide, etc. in a low polar organic solvent, such as an homocylic aromatic solvent, such as benzene, toluene, and the like, a lower hydrocarbon ether such as dioxane, tetrahydrofuran, ethylether, and the like, at a temperature higher than approximately 50° C., and preferably not higher than the reflux temperature of the reaction mixture, for a period of time which may vary between about 5 minutes to about 1 hour, to thus give the corresponding 17-keto androstane (II).

The amount of the strong base used may vary generally between approximately 1 to 10 molar equivalents, with respect to the starting compound. A larger excess of base also produces the corresponding 17-keto-androstanes, however, the amounts used are preferably those mentioned above.

The starting compound (I) may have a great variety of substituents which do not interfere with the course of the reaction, for example, there may be present lower alkyl groups in any position but C–17 and C–20; double bonds in positions, 1, 2, 3, 4, 5, 6, 7, 8, 9, 10, 11, 14 or 15 may be found; hydroxyl groups either free, esterified or etherified in any position but C–17 and C–20, and so forth. The above mentioned substituents which may be modified during the process would not alter the course of the reaction.

It is recommended that the gaseous atmosphere in contact with the reaction mixture does not contain a proportion of oxygen higher to that existing in the air in order to avoid secondary reactions which tend to lower the yield of the final product.

The following specific examples illustrate our invention but are not intended to limit its scope.

EXAMPLE I

A solution of 1 g. of 17α-hydroperoxy-Δ⁹⁽¹¹⁾-5α-pregnen-3β-ol-20-one (Bailey et al. v. supra) in 20 cc. of t-butanol containing 3.6 g. of potassium t-butoxide was heated for 30 minutes on the steam bath. The resulting mixture was diluted with water, the precipitated solid was collected, dried and crystallized from acetone-hexane to give Δ⁹⁽¹¹⁾-5α-androsten-3β-ol-17-one.

EXAMPLE II

Three grams of 17α-hydroperoxy-16β-methyl-5α-pregnan-3β-ol-20-one (Bailey et al. v. supra) in 150 cc. of methanol was treated with a solution of 2 g. of sodium methylate in 30 cc. of methanol and the mixture heated at reflux for 10 minutes. The resulting solution was diluted with water, the solid precipitate was extracted with methylene chloride, the organic extract was washed with water, dried over anhydrous sodium sulfate and evaporated to dryness. The residue was crystallized from acetone-hexane, to give 16β-methyl-androstan-3β-ol-17-one.

EXAMPLE III

A solution of 1 g. of 17α-hydroperoxy-5β-pregnan-3α-ol-11,20-dione in 50 cc. of tetrahydrofuran was treated with a solution of 250 mg. of sodium hydroxide in 10 cc. of water, and the whole was heated at reflux temperature for 20 minutes. The resulting solution was diluted with water and filtered. The precipitate was dried and crystallized from acetone-hexane thus giving 5β-androstan-3α-ol-11,17-dione.

EXAMPLE IV

A solution of 5 g. of 17α-hydroperoxy-Δ⁵-pregnen-3β-ol-20-one in 100 cc. of dioxane was treated with 1 g. of sodium hydride and the resulting mixture was refluxed under nitrogen atmosphere for 45 minutes. The excess reagent was carefully decomposed with diulted hydrochloric acid, at approximately 0° C. Water was added, the resulting mixture was filtered off and the precipitate was dried and crystallized from acetone-hexane, to give Δ⁵-androsten-3β-ol-17-one.

EXAMPLE V

The procedure described in the preceding example was repeated exactly, but the sodium hydride and dioxane were substituted respectively by potassium hydride and tetrahydrofuran.

EXAMPLE VI

A solution of 2 g. of 17α-hydroperoxy progesterone in 100 cc. of benzene was treated with 250 mg. of sodamide and the whole was heated at reflux temperature under an atmosphere nitrogen for 1 hour. The resulting mixture was treated carefully with a mixture of water and ethanol, at approximately 0° C., and then diluted with more water. The benzene layer was separated, washed with water, dried over anhydrous sodium sulfate and evaporated to dryness. Upon crystallization from acetone-hexane there was obtained Δ⁴-androstene-3,17-dione.

EXAMPLE VII

The procedure described in the foregoing example was repeated but sodamide was substituted by potassium amide, giving exactly the same results.

EXAMPLE VIII

17α-hydroperoxy-5β-pregnan-3α-ol-20-one, 17α-hydroperoxy-5α-pregnan-3β-ol-11,20-dione and 3-ethoxy 17α-hydroperoxy-Δ³,⁵-pregnadien-20-one were treated by the procedure described in Example 2, to give respectively 5β-androstan 3α-ol-17-one, 5α-androstan-3β-ol-11,17-dione and 3-ethoxy-Δ³,⁵-androstadien-17-one.

EXAMPLE IX

The procedure described in Example 3 was repeated exactly, with the exception that potassium hydroxide was used instead of sodium hydroxide, giving the same results.

EXAMPLE X

The procedure described in Example 3 was repeated but the solution of sodium hydroxide in water was substituted by a suspension of calcium oxide in water, giving the same results.

We claim:

1. A process for obtaining a 17-keto-androstane-derivative which comprises reacting the corresponding 17α-hydroperoxy 20-keto-pregnane with a strong base at a temperature between approximately 50° C. and the reflux temperature of the reaction mixture.

2. The process of claim 1 wherein the strong base is selected from the group consisting of hydroxides or oxides of alkaline or alkaline-earth metals, lower alcoholates of alkaline metals, alkaline metal hydrides and alkaline metal amides.

3. The process of claim 1 wherein the strong base is potassium t-butoxide.

4. The process of claim 1 wherein the strong base is sodium methylate.

5. The process of claim 1 wherein the strong base is sodium hydroxide.

6. The process of claim 1 wherein the strong base is potassium hydroxide.

7. The process of claim 1 wherein the strong base is sodium hydride.

8. The process of claim 1 wherein the strong base is potassium hydride.

9. The process of claim 1 wherein the strong base is sodamide.

10. The process of claim 1 wherein the strong base is potassium amide.

11. The process of claim 1 wherein the strong base is calcium oxide.

References Cited

UNITED STATES PATENTS 3,056,809   10/1962   Barton et al. _____ 260—397.4

LEWIS GOTTS, *Primary Examiner.*

E. G. LOVE, *Assistant Examiner.*